US012624713B2

(12) United States Patent　　　　　(10) Patent No.:　US 12,624,713 B2
　　Grooters　　　　　　　　　　　　　(45) Date of Patent:　　　May 12, 2026

(54) HYDRAULIC SYSTEM FOR A VEHICLE OR A CONTAINER, AND VEHICLE OR CONTAINER HAVING SUCH A HYDRAULIC SYSTEM

(71) Applicants: E & P Hydraulics B.V., Nieuw-Vennep (NL); STS Industries GmbH, Dornstadt (DE)

(72) Inventor: Frank Paul Grooters, Badhoevedrop (NL)

(73) Assignees: STS INDUSTRIES GMBH, Dornstadt (DE); E & P HYDRAULICS B.V., Nieuw-Vennep (NL)

( * ) Notice: Subject to any disclaimer, the term of this patent is extended or adjusted under 35 U.S.C. 154(b) by 310 days.

(21) Appl. No.: 18/254,053

(22) PCT Filed: Nov. 3, 2021

(86) PCT No.: PCT/EP2021/080537
　　　§ 371 (c)(1),
　　　(2) Date: May 23, 2023

(87) PCT Pub. No.: WO2022/111963
　　　PCT Pub. Date: Jun. 2, 2022

(65) Prior Publication Data
　　　US 2023/0417263 A1　　Dec. 28, 2023

(30) Foreign Application Priority Data
　　Nov. 24, 2020　(EP) ..................................... 20209428

(51) Int. Cl.
　　*F15B 21/00*　　　(2006.01)
　　*B60S 9/12*　　　(2006.01)
　　　　　(Continued)

(52) U.S. Cl.
　　CPC ................ *F15B 21/00* (2013.01); *B60S 9/12* (2013.01); *B65D 90/0033* (2013.01);
　　　　　　(Continued)

(58) Field of Classification Search
　　CPC .... F15B 11/17; B60S 9/02; B60S 9/10; B60S 9/12
　　See application file for complete search history.

(56) References Cited

U.S. PATENT DOCUMENTS 5,915,700 A　　6/1999　Schneider et al.
6,848,693 B2 *　2/2005　Schneider ................. B60S 9/12
　　　　　　　　　　　　　　　　　280/6.155
　　　　　　　(Continued)

FOREIGN PATENT DOCUMENTS

CN　　　203161689 U　*　8/2013　............... B60S 9/12
DE　　102007021287 A1　12/2007
　　　　　　(Continued)

OTHER PUBLICATIONS

JP-S5976660-U (Year: 1984).*
　　　　　　(Continued)

*Primary Examiner* — Jason L Vaughan
(74) *Attorney, Agent, or Firm* — FLYNN THIEL, P.C.

(57)　　　　　ABSTRACT

Hydraulic system and vehicles and containers having such a hydraulic system. The hydraulic system has at least two supporting cylinders for extending ground supports, and at least two hydraulic pumps connected to a hydraulic main line, and at least one supporting cylinder is provided on each of the two hydraulic main lines. The hydraulic system also has a main valve via which the two hydraulic main lines can be connected to one another or disconnected from one another.

19 Claims, 9 Drawing Sheets

(51) Int. Cl.

| | |
|---|---|
| *B65D 90/00* | (2006.01) |
| *B65D 90/14* | (2006.01) |
| *F15B 11/17* | (2006.01) |
| *F15B 15/20* | (2006.01) |

(52) U.S. Cl.
  CPC .............. *B65D 90/14* (2013.01); *F15B 11/17* (2013.01); *F15B 15/204* (2013.01)

(56)                         References Cited

U.S. PATENT DOCUMENTS

| | | | | |
|---|---|---|---|---|
| 7,025,178 | B2 * | 4/2006 | Wengelski | B60S 9/12 187/244 |
| 7,717,485 | B1 | 5/2010 | Hanser et al. | |
| 9,050,947 | B2 * | 6/2015 | Geates | B60S 9/12 |
| 2011/0024706 | A1 | 2/2011 | Schwindaman et al. | |
| 2015/0316078 | A1 * | 11/2015 | Son | F15B 11/08 60/468 |

FOREIGN PATENT DOCUMENTS

| | | | | |
|---|---|---|---|---|
| FR | 1284067 | 2/1962 | | |
| GB | 1452249 | 10/1976 | | |
| JP | S5976660 U | * 5/1984 | | |
| JP | S6088731 A | * 5/1985 | | |
| JP | 2001316096 A | * 11/2001 | .............. | F15B 11/17 |
| WO | WO-2014092222 A1 | * 6/2014 | ............ | E02F 9/2239 |
| WO | WO-2016175352 A1 | * 11/2016 | ................ | E02F 9/20 |

OTHER PUBLICATIONS

JP-S6088731-A (Year: 1985).*
JP-2001316096-A (Year: 2001).*
CN-203161689-U (Year: 2013).*
WO-2014092222-A1 (Year: 2014).*
WO-2016175352-A1 (Year: 2016).*
European Search Report issued in corresponding European Application No. 20209428.0, dated May 11, 2021 (8 pages).
International Search Report, with English translation, issued in corresponding International Application No. PCT/EP2021/080537, date of mailing Jan. 17, 2022 (6 pages).
Written Opinion of International Searching Authority, issued in corresponding International Application No. PCT/EP2021/080537, date of mailing Jan. 17, 2022 (6 pages).

* cited by examiner

HYDRAULIC SYSTEM FOR A VEHICLE OR A CONTAINER, AND VEHICLE OR CONTAINER HAVING SUCH A HYDRAULIC SYSTEM

TECHNICAL FIELD AND BACKGROUND

The invention relates to a hydraulic system for supporting a vehicle or a container on a substrate.

In particular, it is known from the field of caravan trailers and mobile homes that ground supports are extended during stationary mode in order to orientate the vehicle, in particular in order to orientate the floor of an interior horizontally. The same is also known in the case of containers, for example residential containers, which cannot be driven on their own.

The extension of the ground supports is carried out in many cases by means of a hydraulic drive system which extends the ground supports by means of supporting cylinders.

Hydraulic systems of the type in question which are provided for this purpose generally have a hydraulic pump which is able to extend all of the ground supports simultaneously. Depending on the substrate and the vehicle or container, the simultaneous extension of all of the ground supports by the supporting cylinders being simultaneously pressurized by a hydraulic fluid does not lead to a uniform extension, however, since the hydraulic fluid extends those supports to a greater extent which are subjected to the smallest load. In particular in the case of a load distribution which is very uneven, such as for example as can be caused by the engine block of a vehicle, the common pressurization of the supporting cylinders leads to an asymmetrical lifting of the vehicle. This is because the individual supporting cylinders can generally be pressurized by hydraulic fluid by closing the valves. A sequential extension of the supporting cylinders, however, can lead to high structural loads on the vehicle.

It is already known to provide separate hydraulic systems for the individual ground supports so that they can be controlled simultaneously, but individually. A plurality of hydraulic systems, however, leads to high costs and also to a significant space requirement.

It is an object of the invention to provide a hydraulic system and a vehicle or a container and an operating method for the use thereof, which permits a rapid and accurate extension of the support system and which can be constructed in an advantageously small size.

According to one aspect of the invention, to this end a hydraulic system for supporting the vehicle or the container on a substrate is proposed, the hydraulic system having at least two supporting cylinders for extending ground supports and for retracting the ground supports. Preferably, however, there are three or four supporting cylinders for three or four ground supports. In particular in caravan trailers, a design with six supporting cylinders and six ground supports is also expedient.

According to another aspect of the invention, a vehicle or a container is also proposed with at least two, but preferably three or four extendable ground supports. A vehicle according to the invention can be designed, in particular, as a caravan trailer or as a mobile home. However, the vehicle can also be a utility vehicle. According to a further aspect of the invention, containers can be designed as freight containers or other types of utility containers. In particular, however, the vehicle can be a residential container which is generally moved by means of a pick-up vehicle or a truck.

In particular, two ground supports with in each case at least one supporting cylinder are preferably provided at the rear of the vehicle or container, while either one ground support or two ground supports with in each case at least one supporting cylinder are preferably provided at the front of the vehicle.

The hydraulic system has at least two hydraulic pumps which are connected in each case to a hydraulic main line. At least one supporting cylinder is assigned to a first of the hydraulic main lines, so that it can be directly fed by the hydraulic pump connected to these hydraulic main lines. At least one further supporting cylinder is assigned to the other hydraulic main lines so that it can be directly fed by the other hydraulic pump.

The two hydraulic main lines can be connected together so that the hydraulic pumps also can indirectly feed the respective other supporting cylinder, as it were. This connection, however, can be interrupted by an electronic hydraulic controller. To this end, the hydraulic system has a switchable main valve via which the two hydraulic main lines can be connected to one another or disconnected from one another. If the main valve is opened, both hydraulic pumps feed both hydraulic main lines. If the main valve is closed, in each case both hydraulic pumps feed only the hydraulic main line assigned thereto in each case.

In addition to the main valve, preferably one respective separate supporting cylinder valve is also assigned to each supporting cylinder, the supporting cylinder being able to be individually connected thereby to the hydraulic main line assigned thereto or disconnected therefrom. Alternatively or additionally, it can also be provided that each further working cylinder is assigned a control valve, the respective working cylinder being able to be individually connected thereby to the hydraulic main line assigned thereto or disconnected therefrom.

A hydraulic system according to an aspect of the invention could also have more than two hydraulic pumps and more than two hydraulic main lines, for example three hydraulic pumps, which feed three hydraulic main lines which can be connected and disconnected by two or three main valves. Preferably, however, a hydraulic system according to an aspect of the invention is provided with exactly two hydraulic pumps.

The at least two hydraulic pumps can be designed to be structurally separate and optionally even provided in each case with a separate tank for hydraulic fluid. However, the use of a common tank and/or the structural integration of both pumps in a common pump assembly into which the main valve can also be integrated is preferred. In principle, it is possible to provide a single electric motor for both pumps, the output shaft thereof being coupled and decoupled on a case-by-case basis. However, a design with two independent electric motors is preferred, in each case one for each of the two hydraulic pumps.

A hydraulic system according to one aspect of the invention permits two different operating modes, namely the mode with the main valve opened and the mode with the main valve closed.

When the main valve is opened, both hydraulic pumps feed both hydraulic main lines together. Thus, all supporting cylinders can be fed by each of the two hydraulic pumps. Which of the supporting cylinders is actually fed can be controlled by the aforementioned supporting cylinder valves when the main valve is opened.

When the main valve is closed, both pumps feed only one respective hydraulic main line and, depending on the valve position of the supporting cylinder valves, the supporting cylinders connected to this hydraulic main line.

These two operating modes permit different methods and options, wherein in particular it is advantageous to be able to permit a supporting cylinder to be fed in the different extension or retraction phases, on the one hand, by both hydraulic pumps and, on the other hand, by only one hydraulic pump. Thus, depending on the extension or retraction phase, it is possible to meet the respective requirements of high extension speed and accurate adjustment.

In particular, a method for extending the supporting cylinders and thus the ground supports is provided in which initially when the main valve is opened at least one first supporting cylinder of the one hydraulic main line is partially extended, while at least one further supporting cylinder is blocked by the supporting cylinder valve and not extended. Preferably, in this phase both hydraulic pumps together feed the preferably two supporting cylinders of only one of the hydraulic main lines. The extension process thus takes place relatively rapidly. In particular, if the first ground support or the first ground supports have reached the ground, and for example this has been detected by a vibration sensor or an inclination sensor, a changeover process takes place so that the at least one first supporting cylinder is isolated by means of its supporting cylinder valve from the hydraulic pumps and the supporting cylinder valve of the at least one other supporting cylinder is opened. Subsequently, the at least one second supporting cylinder is extended by means of the two hydraulic pumps, preferably in turn until a contact of the at least one second ground support with the ground has been detected. As soon as all of the ground supports have been extended for contact with the ground, the main valve is closed. Now the two supporting cylinders can be fed in each case only by the hydraulic pump assigned to their hydraulic main line. This preferably occurs simultaneously so that in a subsequent phase the at least two supporting cylinders are extended at the same time and fed in each case by one hydraulic pump. In this phase, by the individual activation of the two pumps, a uniform extension can be achieved irrespective of the difference in the load acting on the ground supports and the supporting cylinders.

The structure of the hydraulic system according to the invention has further advantages. Thus, for example, in the case of a defect of a hydraulic pump, the remaining hydraulic pump can maintain an emergency operation by the main valve remaining permanently opened.

A hydraulic system according to one aspect of the invention can also react more flexibly to the demands for the currently required flow rate. While in systems with only one hydraulic pump generally this one flow rate can pump between a structurally limited minimum quantity and a structurally limited maximum quantity, a system with two hydraulic pumps is more flexible since the hydraulic flow can be halved by deactivating one of the hydraulic pumps.

In particular, if the supporting cylinders or other working cylinders are also able to be operated very slowly and/or accurately adjusted, a system according to an aspect of the invention with two hydraulic pumps is advantageous since they can be configured for small volumetric flow rates and they can nevertheless provide a high volumetric flow rate together by connecting both hydraulic pumps, as required.

The at least one supporting cylinder of the first hydraulic main line is preferably a front supporting cylinder for extending a front ground support, while the at least one supporting cylinder of the second hydraulic main line is a rear supporting cylinder for extending rear ground supports. One of the hydraulic main lines is thus assigned to the front side of the vehicle or the container, while the other hydraulic main line is assigned to the rear side. This is expedient since a non-uniform load distribution in vehicles and containers is generally provided, in particular in their main direction or direction of travel, in particular by arranging the engine or other technical systems on the front side or rear side.

A preferred alternative assignment is implemented by the provision of six supporting cylinders which are arranged in three pairs which are offset to one another in the vehicle longitudinal direction. Such a design is advantageous in caravan trailers. The central supporting cylinder pair is generally arranged in the region of the axles, while the other two pairs of supporting cylinders are provided on the front end or rear end of the vehicle. In such a design it is regarded as advantageous if the central supporting cylinder pair is assigned to one of the hydraulic main lines, while the other four supporting cylinders are assigned to the other hydraulic main line.

In a preferred design of the hydraulic system, it is further provided that the hydraulic system has a check valve between the assigned hydraulic pump and a control valve or a supporting cylinder valve, wherein such a check valve can be provided in individual cylinders or some supporting cylinders or working cylinders or in all cylinders.

The check valve ensures that, when the control valve or supporting cylinder valve is opened, hydraulic fluid cannot flow back into the hydraulic tank. Only when the control valve or the supporting cylinder valve is closed is this possible by a corresponding outflow at the valve. Thus, by opening the control valve or supporting cylinder valve, the relevant cylinder can be blocked from a retracting movement, for example in order to retract only a few supporting cylinders in a targeted manner.

This is quite particularly advantageous if the hydraulic system has two separate return lines which in each case connect at least one pressure chamber of at least one supporting cylinder or at least one working cylinder acting in the retracting direction, in each case to one of the hydraulic pumps. Thus, the two hydraulic pumps permit two cylinders, which are provided on different return lines, to retract synchronously, by the two hydraulic pumps driving the two cylinders with an identical volumetric flow rate.

In this case, it can be additionally provided that the hydraulic system has a second main valve via which the two return lines can be connected to one another or disconnected from one another by means of an electrical switching signal. According to the already described hydraulic main lines which are pressurized for the purpose of the extending movement on the supporting cylinders and to this end can be connected on a case-by-case basis and disconnected on a case-by-case basis by means of the first main valve, the return lines can be connected and disconnected by the second main valve in order to control specifically with a retracting movement on the cylinders which hydraulic pump retracts which cylinder.

According to an aspect of the invention, the hydraulic system is primarily provided for extending and retracting the supporting cylinders of the container or vehicle. However, it can be also used for further functions of the vehicle or container. In such a design, the hydraulic system has at least one hydraulic motor or a further working cylinder.

This further working cylinder or hydraulic motor, or preferably two working cylinders or two hydraulic motors, can be provided for one of the following functions:

One possible function is to be able to control an extendable space of the vehicle or container, an interior of the vehicle being able to be flexibly enlarged thereby. Such an extendable space can be extended vertically or horizontally, but preferably horizontally. In particular, it can also enlarge a floor area of the interior. In the case of a mobile home or a caravan trailer, the extendable space can provide a kitchenette or a sleeping option, for example.

A further function, which can be provided by one or more additional working cylinders or hydraulic motors, is the control of a closing element of a storage space or an interior or a lifting platform. The closing element can be, in particular, a pivotable flap. A flap with a combined pivoting and lifting movement is also possible.

In particular in a mobile home, a residential container or a caravan trailer, the additional function which the hydraulic system performs can be the control of an entry system, in particular on an extendable step or an extendable stair system, which is provided in the region of an access door of the vehicle or the container.

A further conceivable function, which can preferably be implemented by two hydraulic motors of the hydraulic system, is that of a movement system, the vehicle being able to be maneuvered thereby. In such a movement system, preferably a hydraulic motor is provided in each case on the left-hand and the right-hand vehicle side, the hydraulic motor in each case driving at least one right-hand and one left-hand wheel.

Also encompassed by the invention are vehicles and containers which provide additional working cylinders and/or hydraulic motors for a plurality of the aforementioned functions. Thus, for example, a caravan can also have, in addition to the ground supports, a movement system, an entry system and extendable space for enlarging the interior which can all be driven by means of the one hydraulic system.

Depending on the type of additional function, preferably two or more additional working cylinders or two or more hydraulic motors are provided. These can be provided on either side of the element to be moved, for example on either side to the left and right of an extendable space. In such a case, it is regarded as preferred if the two hydraulic motors or the two further working cylinders are provided on different hydraulic main lines. As a result, the advantage of the two hydraulic pumps, regarding the cooperation on a case-by-case basis and the individual action on a case-by-case basis in the event of an asymmetrical load, can also be used in the aforementioned additional functions.

The hydraulic pumps are preferably provided to bring about both the extension and retraction of the supporting cylinders or the working cylinders. Preferably, it is provided that by reversing their rotational direction the hydraulic pumps are able to move the supporting cylinders or working cylinders in the opposing direction. In a preferred embodiment, it can be provided that the hydraulic system has an outflow pressure compensator, a synchronous outflow or a synchronous inflow being able to be ensured thereby in a pressure chamber of the cylinders acting in the retracting direction of the cylinders.

BRIEF DESCRIPTION OF THE DRAWINGS

Further advantages and aspects of the invention are found in the claims and the following description of preferred exemplary embodiments of the invention which are explained hereinafter with reference to the figures.

DETAILED DESCRIPTION OF THE
EXEMPLARY EMBODIMENTS

Figures 1, 2, 3, 4:
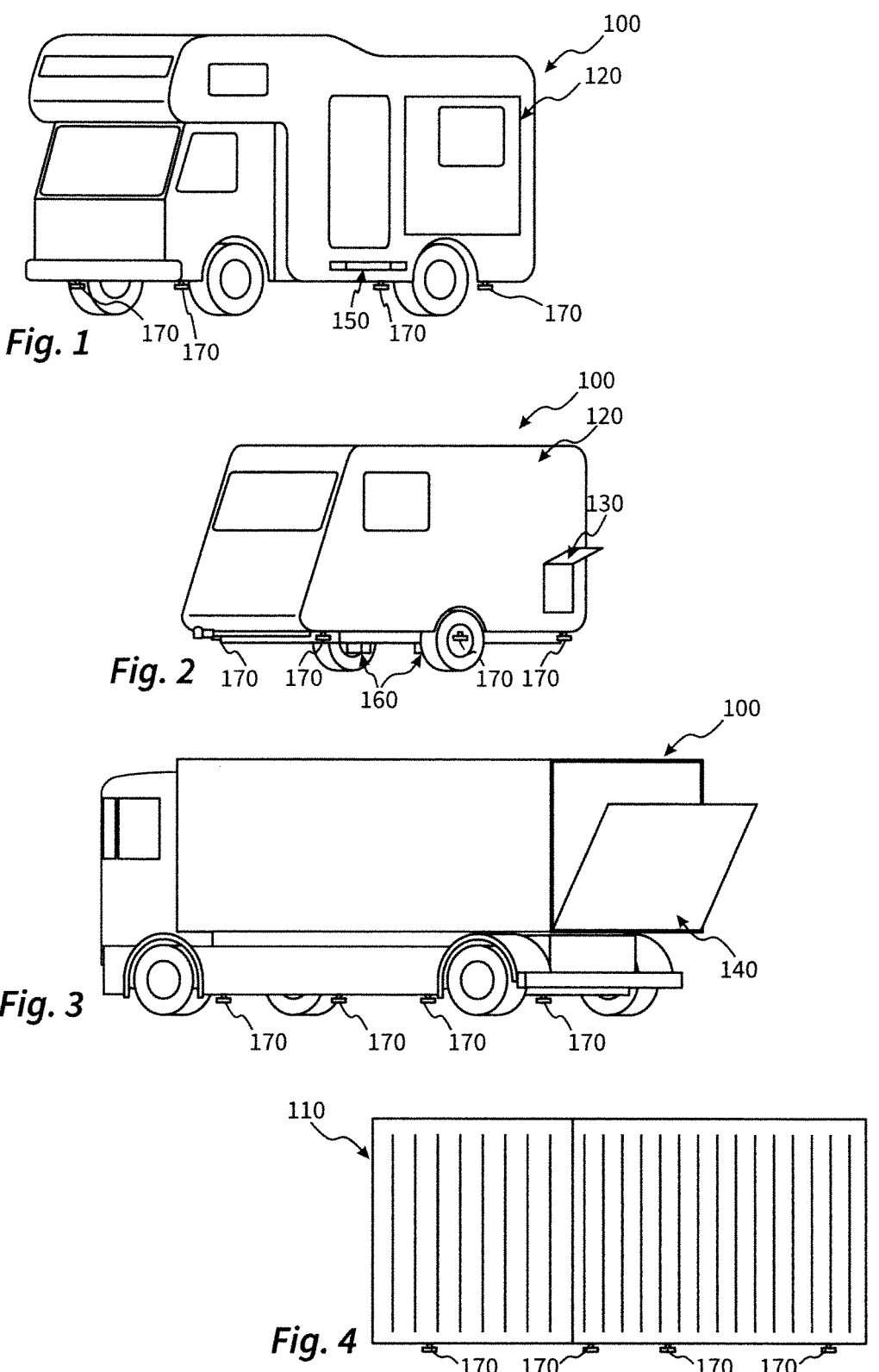
FIGS. 1 to 4 show various vehicles and a container which are provided in each case with a hydraulic support system, and in some cases with further hydraulically driven components.

FIGS. 1 to 3 show various vehicles 100 according to the invention which are provided in each case with a hydraulic system 10 according to the invention. FIG. 4 shows a container 110 with such a hydraulic system 10, wherein such a container is generally moved by means of a truck or a pick-up vehicle between different locations.

Figure 5:
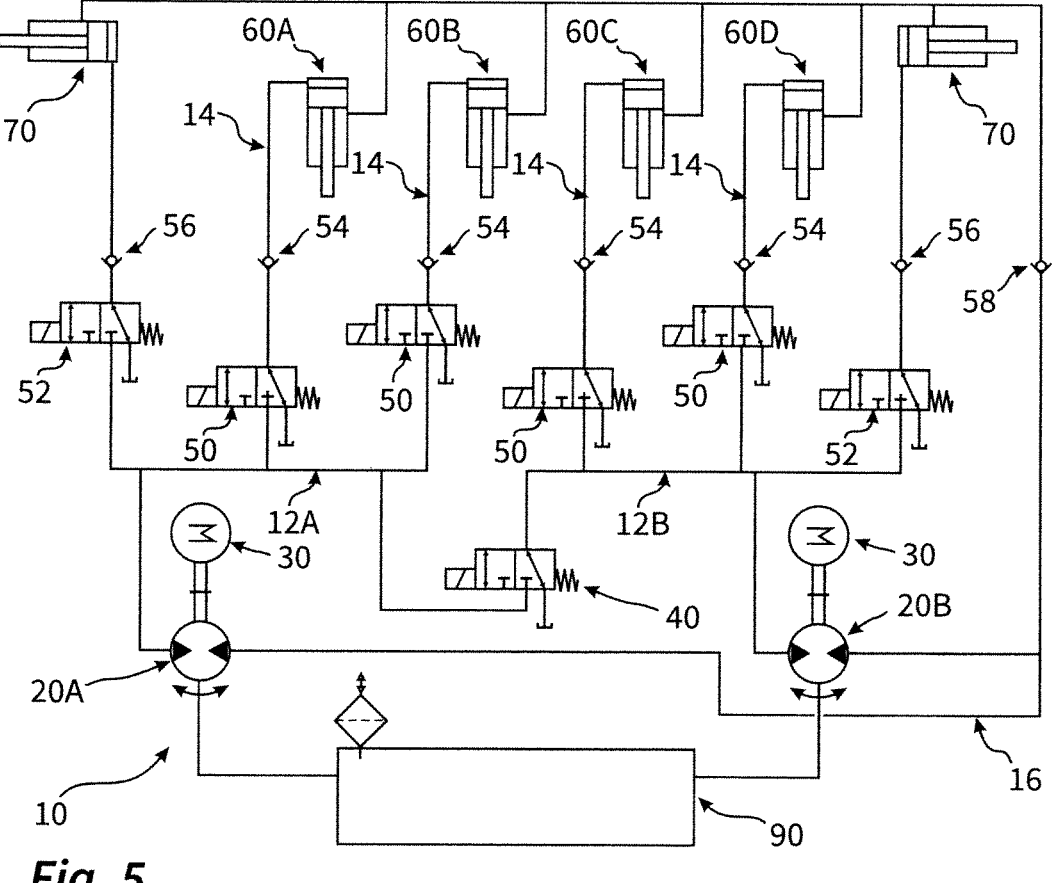
FIG. 5 shows in a schematic view a hydraulic system for driving the hydraulic support system and the further hydraulically driven components.

All of the vehicles 100 and the container 110 have a support system with in each case a total of four ground supports 170 which are extended vertically during stationary mode of the vehicle or at the installation site of the container 110, in order to be able to support the weight force of the vehicle and the load thereof in a stable manner on a substrate. Each of these ground supports is assigned a supporting cylinder 60A to 60D as shown in FIG. 5. The view selected here of vertically extendable ground supports 170 is only to be understood as an example. The ground supports could also be provided as pivotably movable ground supports or on horizontally extendable ground support carriers.

In addition to the ground supports 170, the vehicles 100 of FIGS. 1 to 3 have various further hydraulically operated functionalities. The assignment to the various vehicles or the container is only to be understood as an example. All of the aforementioned functionalities can be used in all of the units of FIGS. 1 to 4.

By way of example, a hydraulically extendable step 150 and an extendable space 120, which can be extended and retracted by two working cylinders 70 provided on either side of the extendable space 120, are provided as additional hydraulic functions on the mobile home 100 of FIG. 1.

In the case of the caravan trailer 100 of FIG. 2, a hydraulically foldable flap element 130 is shown, a storage space being able to be closed thereby.

In the case of the truck 100 of FIG. 3, a rear loading flap 140 with a pivoting and lifting movement is provided.

A hydraulic system according to one aspect of the invention is configured at least to actuate the supporting cylinders 60A to 60D of the ground supports 170. Preferably, however, such a system is configured to operate all of the aforementioned hydraulic components.

FIG. 5 shows such a hydraulic system 10 in a schematic view.

Supply lines 14, which feed into the aforementioned four supporting cylinders 60A, 60B, 60C, 60D, of which two supporting cylinders 60A, 60B are front supporting cylinders and two supporting cylinders 600, 60D are rear supporting cylinders, extend to electrically switchable supporting cylinder valves 50 which control the inflow of hydraulic fluid in each case into one of the pressure chambers of the supporting cylinders 60A, 60B, 60C, 60D. Check valves 54 are provided between the supporting cylinder valves 50 and the supporting cylinders 60A, 60B, 60C, 60D, the check valves preventing a return flow of hydraulic fluid from the supporting cylinders 60A, 60B, 60C, 60D back in the direction of the supporting cylinder valves 50, up to a limit pressure. When the return line 16 is pressurized, however, the check valves 54 are opened for the purpose of retracting the supporting cylinders 60A, 60B, 60C, 60D.

The total of four supporting cylinder valves 50 are connected to two different hydraulic main lines 12A, 12B, namely the supporting cylinder valves 50 of the front supporting cylinders 60A, 60B to the hydraulic main line 12A and the supporting cylinder valves 50 of the supporting cylinders 60C, 60D to the second hydraulic main line 12B. A hydraulic pump 20A, 20B operated by an electric motor 30 is assigned in each case to both hydraulic main lines 12A, 12B. As a function of the rotational direction of these hydraulic pumps 20A, 20B, they pump hydraulic fluid in particular from the hydraulic fluid tank 90 into their respective hydraulic main line 12A, 12B or into the return line 16, which is also provided with a check valve 58 which is opened in the case of limit pressure. The hydraulic pumps 20A, 20B are designed such that with a first rotational direction, and thus when pumping hydraulic fluid into the respective hydraulic main line 12A, 12B, the hydraulic fluid can flow back at the same time from the return lines 16 into the hydraulic fluid tank 90. With the reverse rotational direction, and when pumping hydraulic fluid into the return lines 16, hydraulic fluid can flow back from the hydraulic main lines 12A, 12B into the hydraulic fluid tank 90.

The two hydraulic main lines 12A, 12B can be switched between a connected state and a disconnected state by means of a switchable main valve 40. If the main valve 40 is closed, so that the hydraulic main lines 12A, 12B are disconnected from one another, the two pumps 20A, 20B can feed only hydraulic consumers on their respective hydraulic main line 12A, 12B. If the main valve 40 is opened, the two pumps 20A, 20B can respectively feed together or individually all of the hydraulic consumers on both hydraulic main lines 12A, 12B.

In addition to the aforementioned supporting cylinders 60A to 60D, two further hydraulic cylinders 70 are provided in the exemplary view of FIG. 5. These cylinders are working cylinders 70 of one or more of the aforementioned hydraulic additional functions of the vehicle. In particular, both working cylinders 70 can be assigned to the same additional function, for example they can represent the left-hand and right-hand working cylinders of the extendable space 120. The two working cylinders 70 are connected to different hydraulic main lines 12A, 12B. In each case, a control valve 52 and a check valve 56 are assigned to both working cylinders, which permits a return flow in the direction of the control valves 52 only in the case of pressure above a defined limit pressure.

The use of the hydraulic system 10 of FIG. 5 is explained with reference to FIGS. 6A to 11.

Figure 6A:
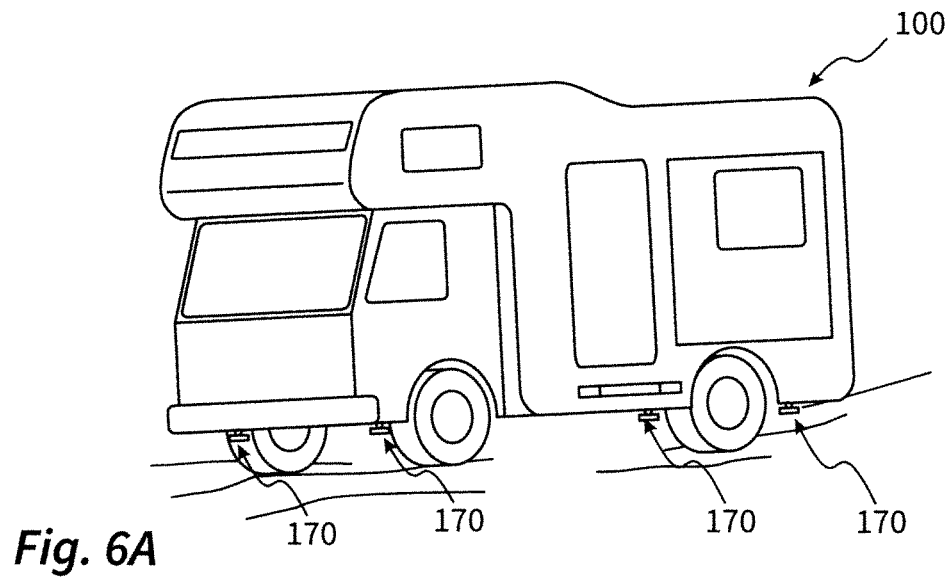
FIGS. 6A to 11 show a sequence by way of example relating to the use of the hydraulic system in the example of a mobile home.

FIG. 6A shows a mobile home which stands at its intended target position on sloping terrain, and is to be supported here as intended.

Figure 6B:
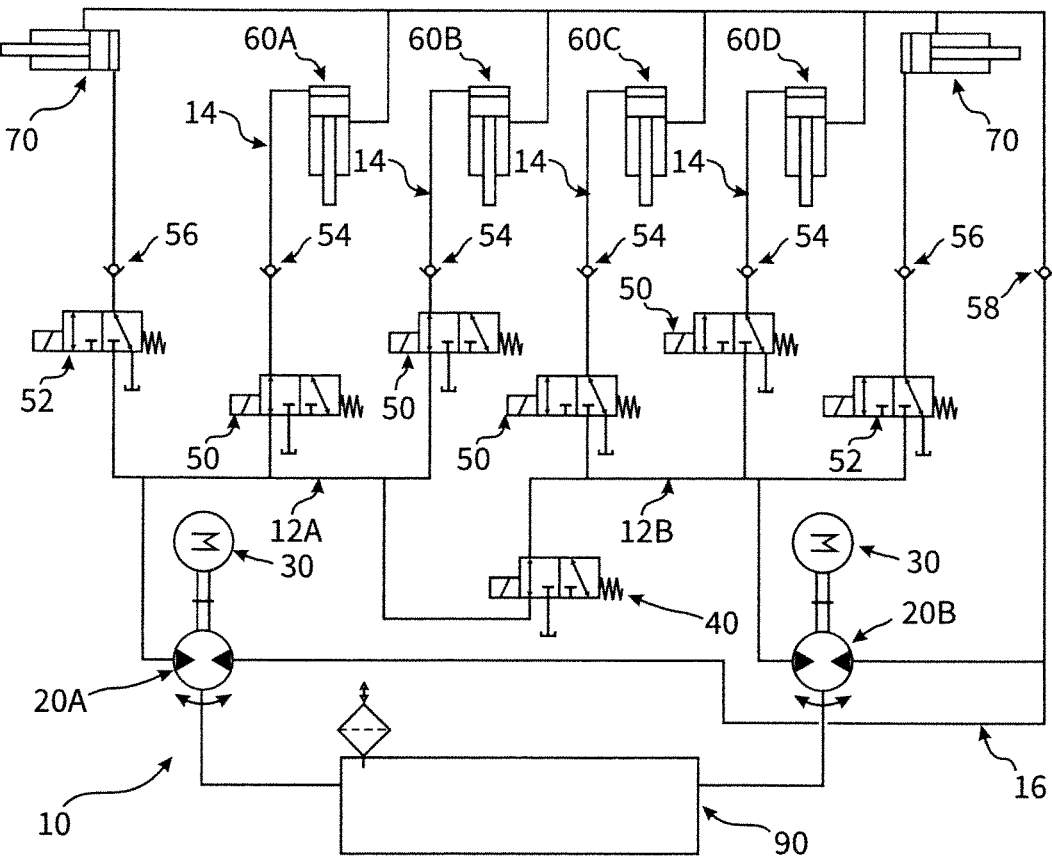
Figure 7B:
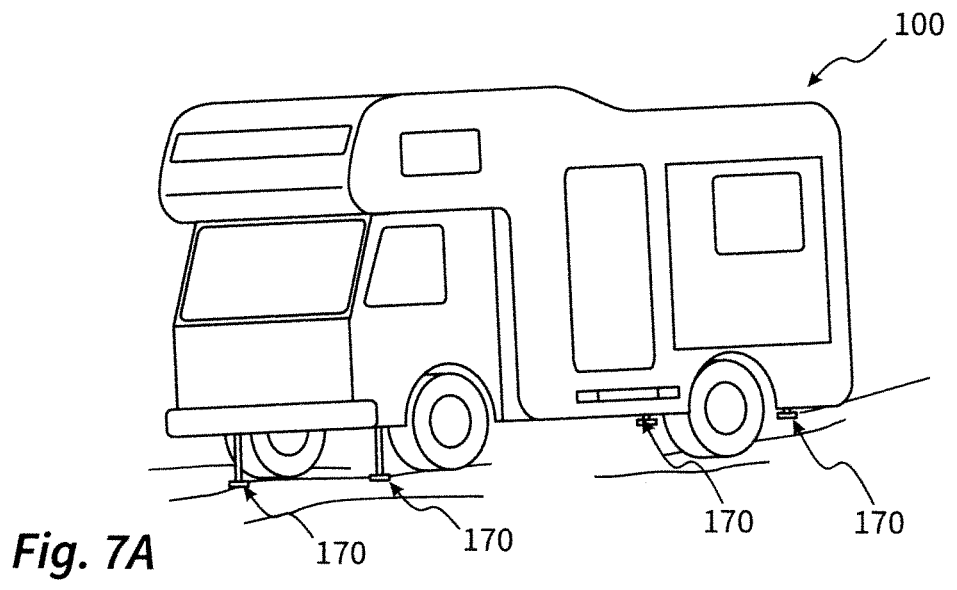
Figure 7B:
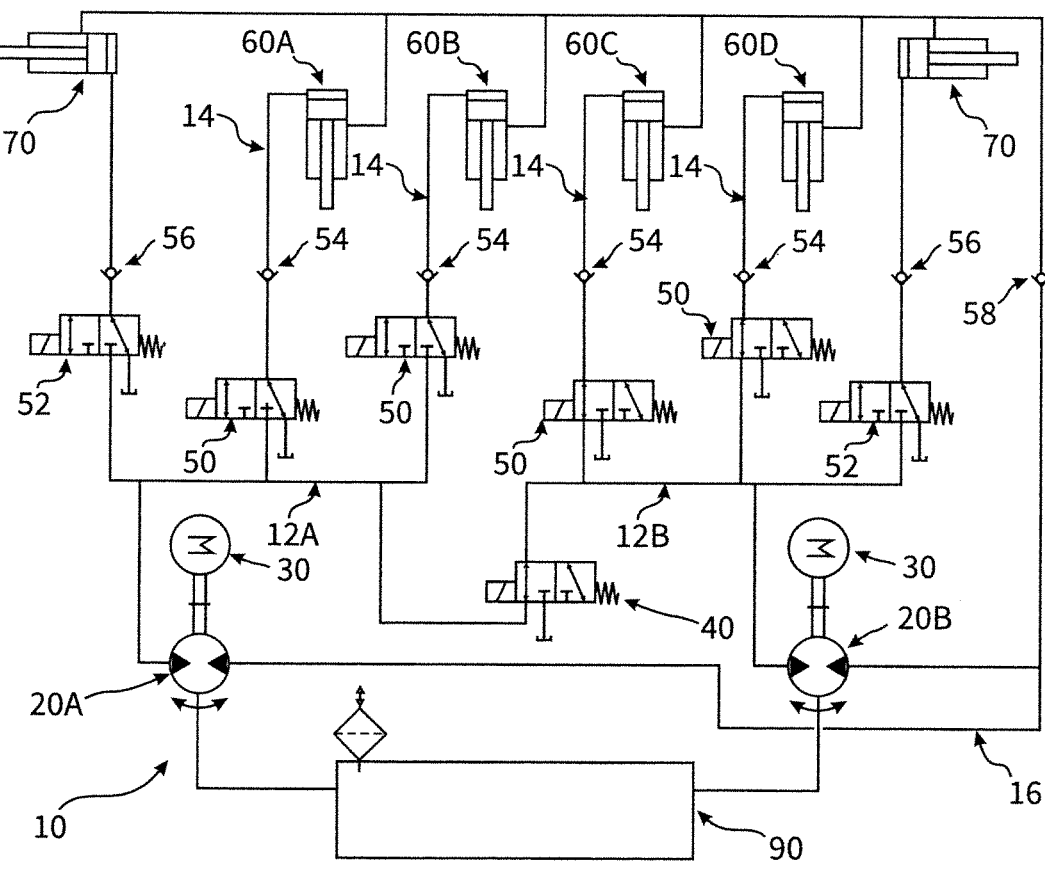
Figure 8A:
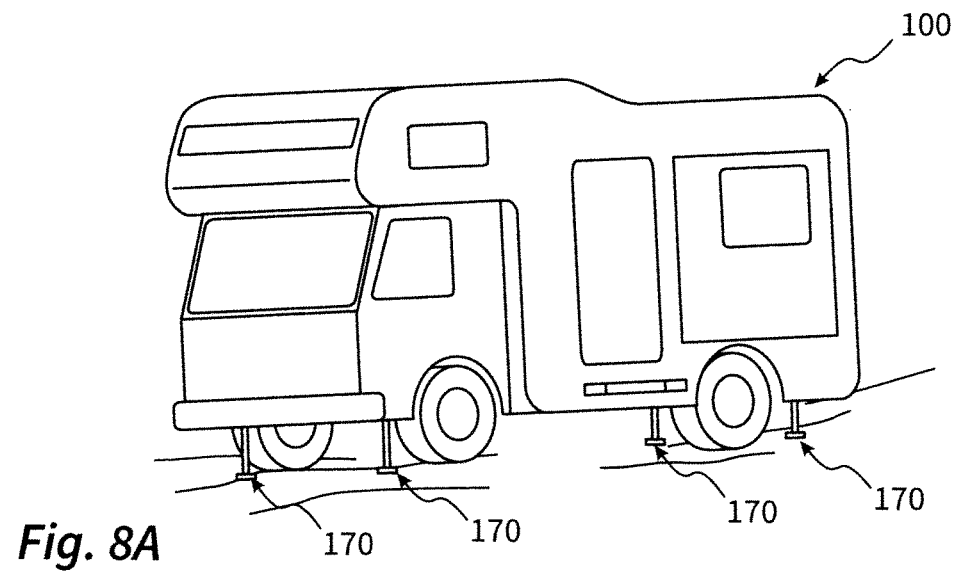
Figure 8B:
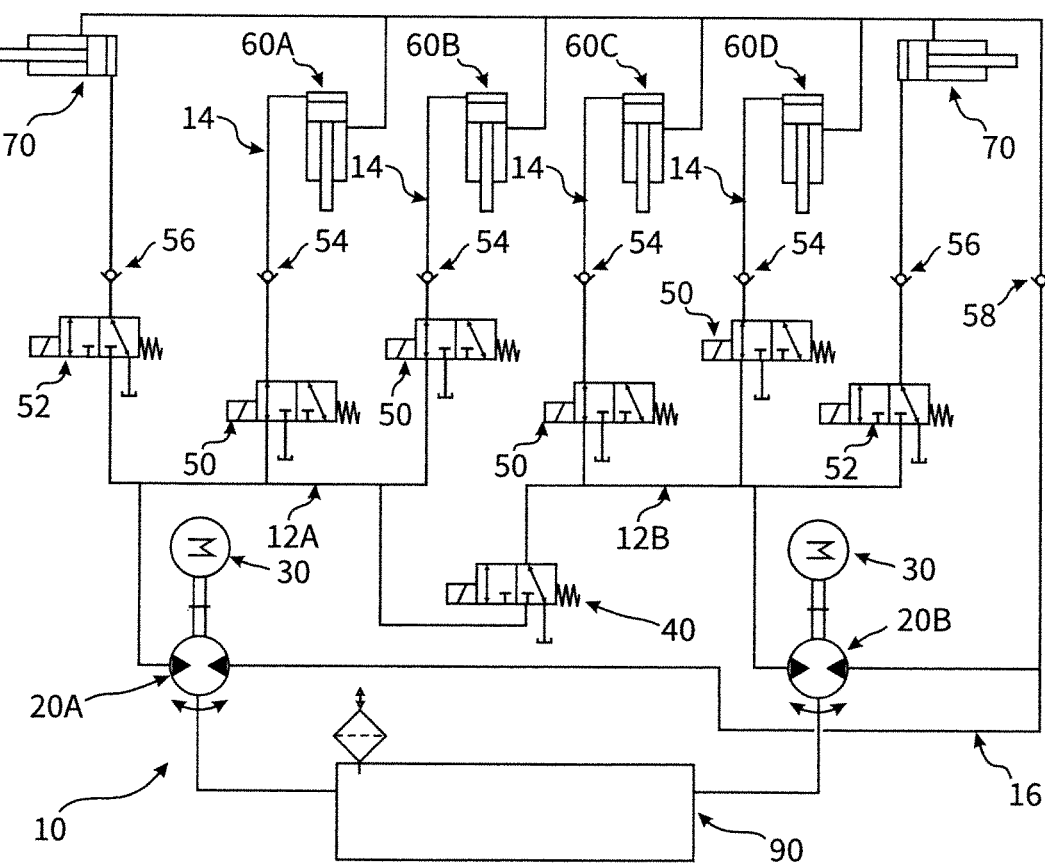

For extending the four ground supports 170, the hydraulic system 10 is initially adjusted in the manner shown in FIG. 6B such the main valve 40 is opened, while only two supporting cylinder valves 50 are also opened, namely the supporting cylinder valves 50 of the front supporting cylinders 60A, 60B. In this state, the two hydraulic pumps 20A, 20B are operated such that they pump hydraulic fluid into the hydraulic main lines 12A, 12B which are connected together. Due to the hydraulic fluid flowing into the pressure chambers, the two supporting cylinders 60A, 60B are extended while the hydraulic fluid of the respectively opposing pressure chambers is discharged through the return line 16 and into the hydraulic fluid tank 90. In this phase, the check valve 58 is opened under the pressure of the hydraulic fluid coming from the supporting cylinders, which is above a relevant limit pressure of the check valve 58. As both pumps 20A, 20B together only extend two ground supports 170, this takes place at high speed. The movement initially ends as soon as the front ground supports 170 come into contact with the ground as shown in FIG. 7A. This is detected by a sensor.

As a reaction thereto, the valve position of the hydraulic system 10 changes. In the manner illustrated in FIG. 7B, the supporting cylinder valves 50 of the supporting cylinders 60A, 60B are closed, while the supporting cylinder valves 50 of the rear supporting cylinders 60C, 60D are opened. In turn, the rear ground supports 170 are extended by being fed by both hydraulic pumps 20A, 20B until the state of FIG. 8A has been reached, i.e. all of the ground supports have made contact with the ground.

Figure 9A:
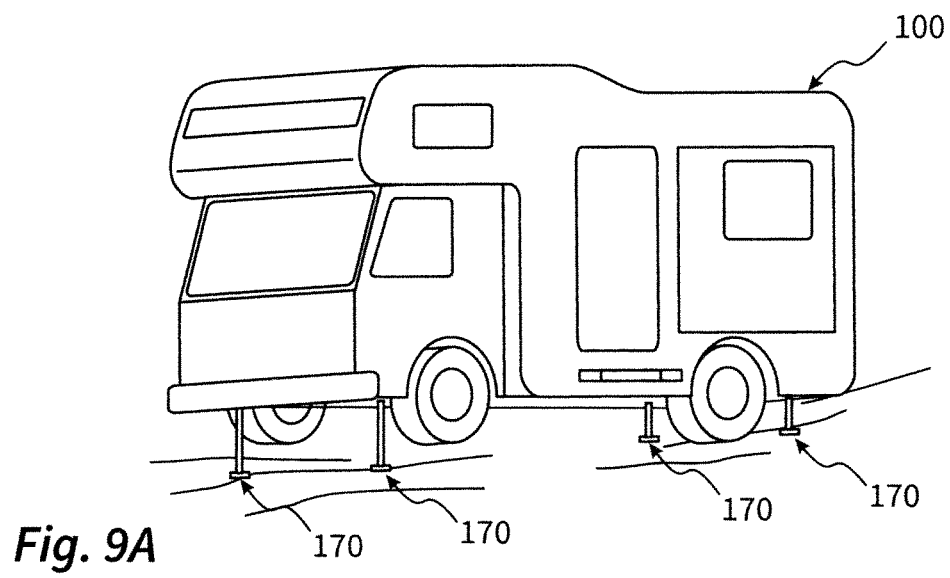
Figure 9B:
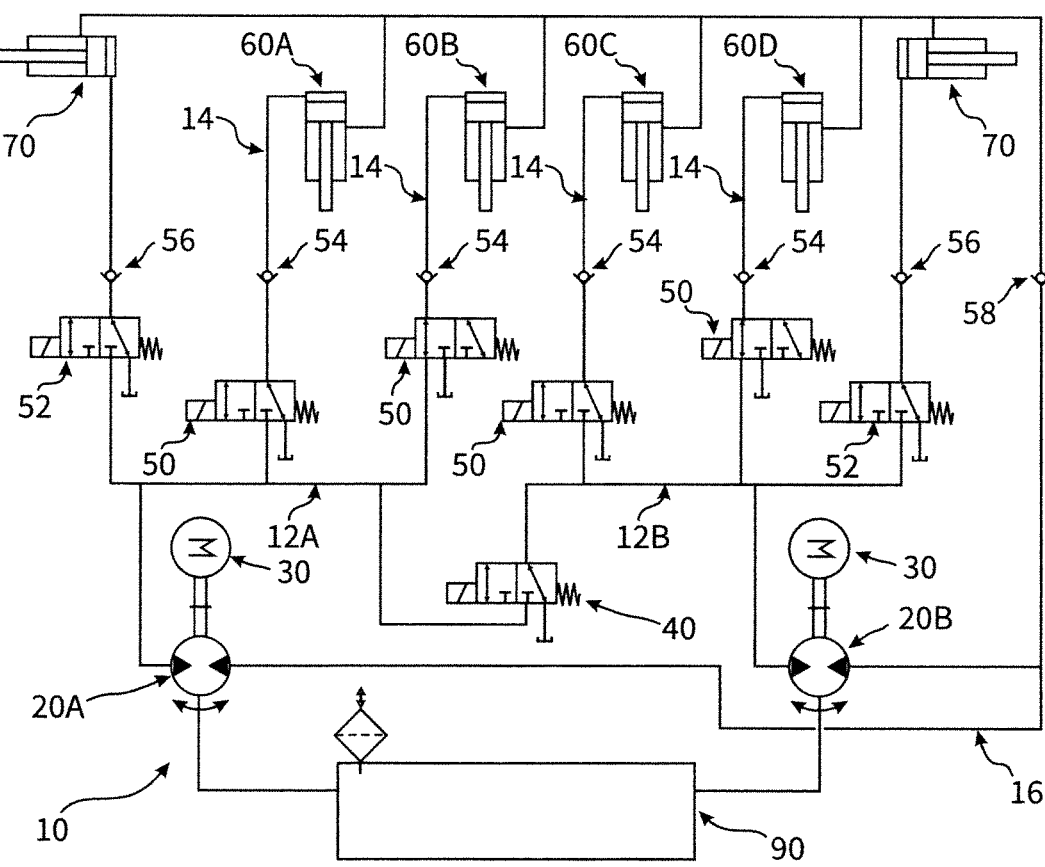

Now the main valve 40 is closed so that each of the two hydraulic pumps 20A, 20B can feed only the supporting cylinders 60A, 60B or 60C, 60D of the respectively dedicated hydraulic main line 12A, 12B. Then all of the supporting cylinder valves 50 are opened and the two pumps 20A, 20B can extend the supporting cylinders 60A, 60B, 60C, 60D directly assigned thereto, in a targeted manner respectively with a individually adapted volumetric flow and/or pressure until the lifted and oriented state of the vehicle 100 shown in FIG. 9A is reached. Since the vehicle is subjected to force and lifted very uniformly, the structural loading is negligible.

Figure 10A:
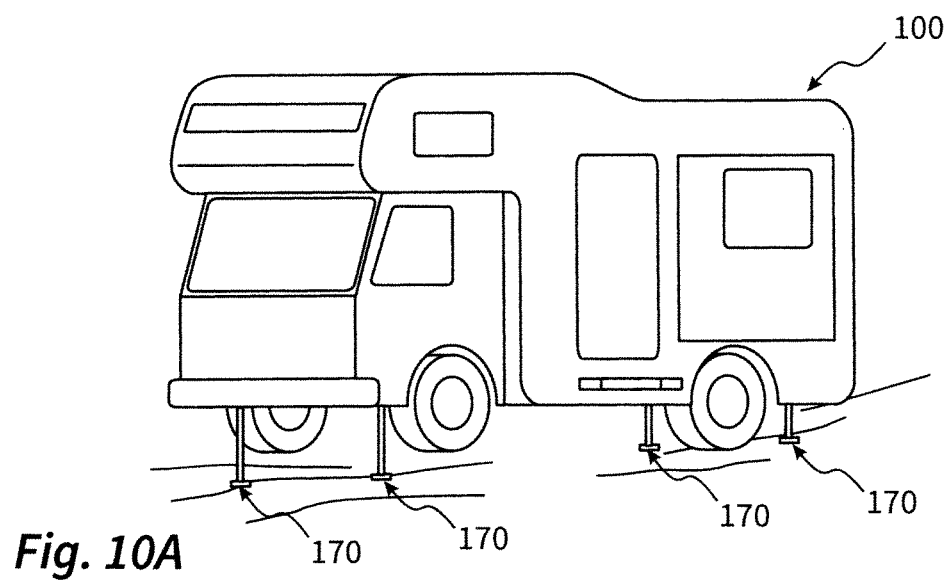

The vehicle 100 is now oriented horizontally relative to the vehicle longitudinal direction, but not yet horizontally relative to the vehicle transverse direction. Thus in the manner illustrated in FIG. 9B, with the main valve 40 still closed, the supporting cylinder valves 50 of the right-hand supporting cylinders 60B, 60D are now opened. As a result, the hydraulic pumps 20A, 20B can also orientate the vehicle 100 in the transverse direction so that the state of FIG. 10A is achieved.

Figure 10B:
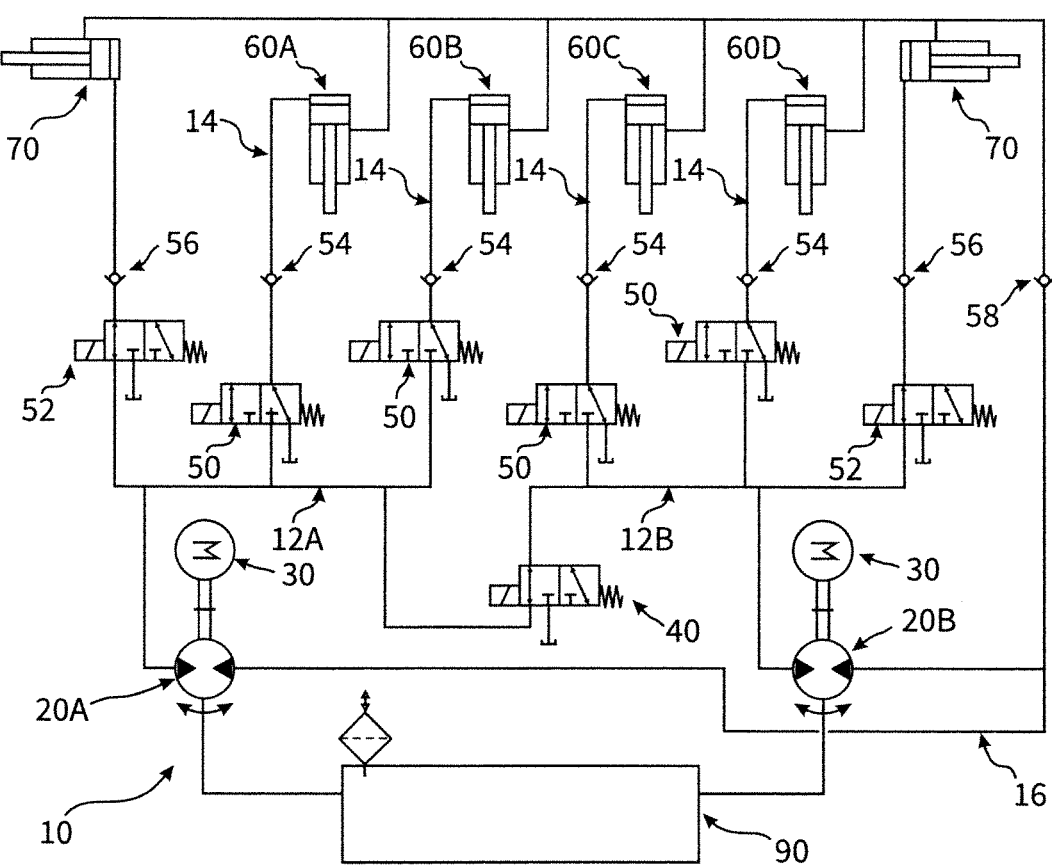
Figure 11:
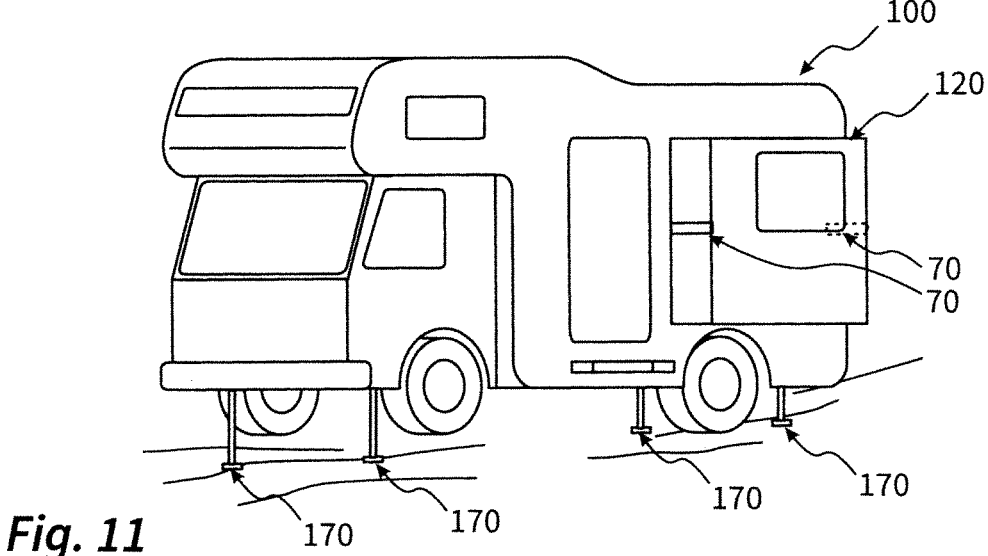

Subsequently, in the manner illustrated in FIG. 10B, the main valve 40 is opened again and all of the supporting cylinder valves 50 are closed. At the same time, however, the two valves 52 of the working cylinders 70 are opened so that now the two hydraulic pumps 20A, 20B together extend the two working cylinders 70 and as a result bring the extendable space 120 into its use position of FIG. 11. Alternatively, the main valve 40 could also remain closed when the extendable space 120 is extended. The opened state, however, advantageously permits a very slow movement into the end position toward the end of the extension movement, by switching off one of the pumps.

If the mobile home is to be lowered again, the pumping direction of the hydraulic pumps 20A, 20B is changed so that these hydraulic pumps together pump hydraulic fluid into the return line 16. As a result, the supporting cylinders 60A, 60B, 60C, 60D and the working cylinders 70 are retracted. The hydraulic fluid, which is pumped into the pressure chambers of the supporting cylinders 60A, 60B, 60C, 60D during the lifting process, is forced in the direction of the supporting cylinder valves 50 due to the sufficiently high pressure in the return line 16, wherein the pressure is above the limit pressure of the check valves 54 and thus opens these check valves. Hydraulic fluid can flow back into the hydraulic tank at the closed supporting cylinder valves 50. A uniform return flow and thus a uniform retraction of the ground supports can be implemented by means of an outflow pressure compensator, not shown.

9

Figure 12:
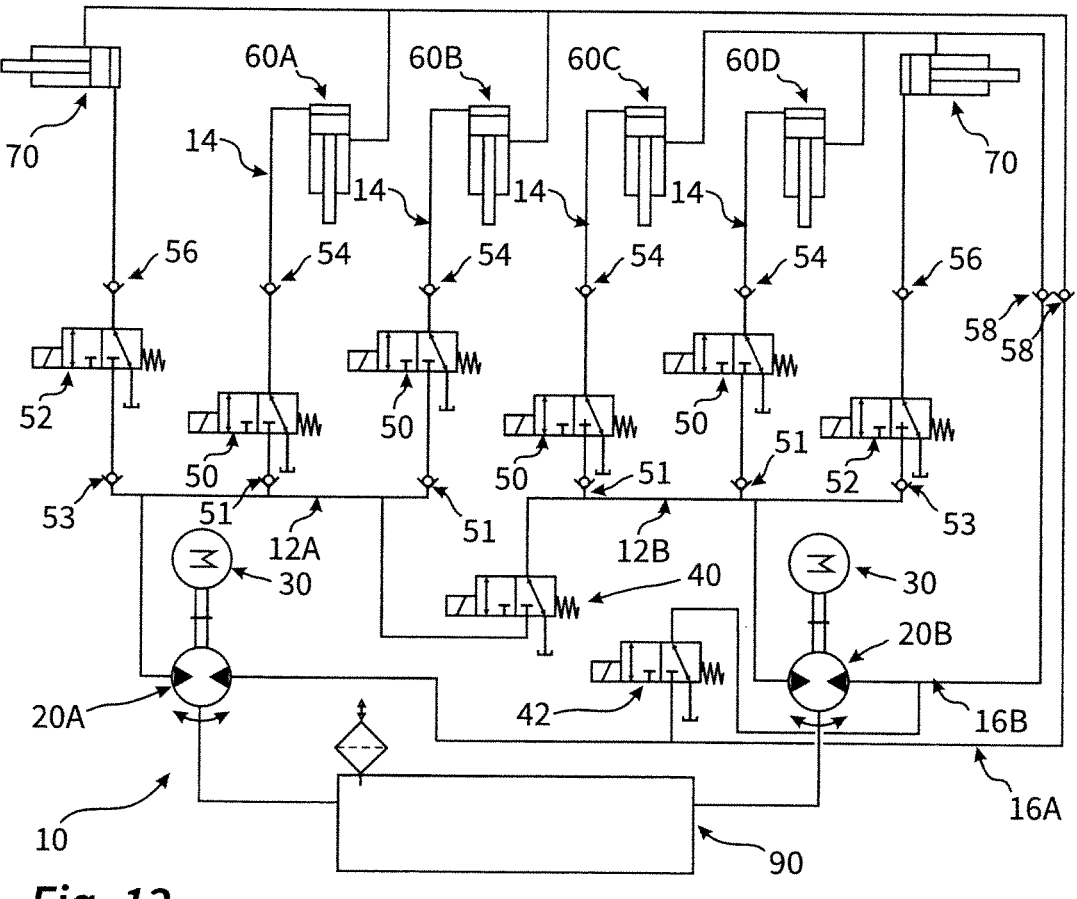
FIG. 12 shows an alternative embodiment of a hydraulic system in a schematic view.

FIG. 12 shows an alternative design of the hydraulic system 10. Deviating from the design described above, two return lines 16A, 16B are provided here, wherein the return line 16A is connected to the pressure chambers 70 of the cylinders 60A, 60B of the first hydraulic main line 12A acting in the retracting direction and wherein the return line 16B is connected to the pressure chambers 70 of the cylinders 60C, 60D of the second hydraulic main line 12B acting in the retracting direction.

Similar to the hydraulic main lines 12A, 12B, the two return lines 16A, 16B are able to be connected to one another and disconnected from one another via a further main valve 42.

In addition to the components of the above design, the hydraulic system 10 of FIG. 12 also has check valves 51, 53 which are provided between the hydraulic main lines 12A, 12B and the supporting cylinder valves 50 or control valves 52. When the supporting cylinder valve 50 or control valve 52 is opened, these check valves prevent hydraulic fluid from being able to pass out of the supporting cylinders 60A, 60B, 60C, 60D or the working cylinders 70 back into the hydraulic fluid tank 90.

This design is advantageous, in particular, since when the supporting cylinders 60A, 60B, 60C, 60D or the working cylinders 70 are retracted, a differentiated control is possible.

If the main valve 42 is opened and the supporting cylinder valves 50 and the control valves 52 are closed, when the supporting cylinders 60A, 60B, 60C, 60D and the working cylinders 70 are retracted, the same behavior results as in the design of the hydraulic system according to FIG. 5. The fluid flow of both hydraulic pumps 20A, 20B acts simultaneously on all cylinders in the retracting direction. The hydraulic fluid which is respectively present in the other pressure chamber 70 of the cylinders 60A, 60B, 60C, 60D is forced out of the cylinders in the direction of the supporting cylinder valves 50 and the control valves 52 and thus passes directly back into the hydraulic fluid tank 90.

However, if some of the controllable valves are opened, for example all four supporting cylinder valves 50, the hydraulic fluid cannot initially escape out of the supporting cylinders 60A, 60B, 60C, 60D. It could open the check valves 54, which open with sufficient overpressure, but not the check valve 51. The supporting cylinders 60A, 60B, 60C, 60D are thus not initially retracted.

Instead, due to the pumping pressure of the hydraulic pumps 20A, 20B only the working cylinders 70 are initially retracted if the control valves 52 thereof are closed and thus permit the outflow of hydraulic fluid into the hydraulic fluid tank 90.

The above-described second main valve 42 can additionally be closed in order to disconnect the two return lines 16A, 16B from one another. If this is the case, each working cylinder 70 is driven by one of the hydraulic pumps 20A, 20B. If the hydraulic pumps 20A, 20B are adjusted to an identical flow rate, a uniform retraction is enforced thereby.

The invention claimed is:

1. A hydraulic system for supporting a vehicle or a container on a substrate, the hydraulic system comprising:
   at least two supporting cylinders for extending ground supports;
   at least two hydraulic main lines;
   at least two hydraulic pumps, each being connected to one of the two hydraulic main lines;
   a first electric motor connected to one of the two hydraulic pumps;

a second electric motor connected to another of the two hydraulic pumps;
   at least a first one of the two supporting cylinders being connected for fluid communication with a first of the two hydraulic main lines such that the first one of the two supporting cylinders is supplied with fluid by the first hydraulic main line;
   at least a second one of the two supporting cylinders being connected for fluid communication with a second of the two hydraulic main lines such that the second one of the two supporting cylinders is supplied with fluid by the second hydraulic main line; and
   a switchable main valve disposed to selectively fluidly connect or disconnect the first and second hydraulic main lines to one another or from one another, respectively.

2. The hydraulic system as claimed in claim 1, wherein the hydraulic system is configured such that when the main valve is closed at least the first one of the two supporting cylinders is fed exclusively by one of the two hydraulic pumps and the first hydraulic main line and at least the second one of the two supporting cylinders is fed exclusively by the other of the two hydraulic pumps and the second hydraulic main line.

3. The hydraulic system as claimed in claim 1, wherein the at least the first one of the two supporting cylinders connected with the first hydraulic main line comprises a front supporting cylinder for extending a front ground support, and the at least the second one of the two supporting cylinders connected with the second hydraulic main line comprises a rear supporting cylinder for extending rear ground supports.

4. The hydraulic system as claimed in claim 3, wherein:
   the at least the first one of the two supporting cylinders connected to the first hydraulic main line comprises two front supporting cylinders connected to the first hydraulic main line, and the at least the second one of the two supporting cylinders connected to the second hydraulic main line comprises two rear supporting cylinders connected to the second hydraulic main line; or
   the at least the second one of the two supporting cylinders connected to the second hydraulic main line comprises two rear supporting cylinders connected to the second hydraulic main line.

5. The hydraulic system as claimed in claim 1, wherein the hydraulic system comprises at least two hydraulic motors or two working cylinders for driving a common unit or a common system, and the two hydraulic motors or the two working cylinders are provided on different ones of the two hydraulic main lines.

6. The hydraulic system as claimed in claim 1, wherein:
   the hydraulic system comprises at least two supporting cylinder valves, each of the at least the first one and at the at least the second one of the two supporting cylinders being associated with one of the two supporting cylinder valves, and each of the at least the first one and the at least the second one of the two supporting cylinders being individually connectable to or individually disconnectable from, by the associated one of the two supporting cylinder valves, the first or second hydraulic main line connected thereto; or
   the hydraulic system comprises two working cylinders for driving a common unit or a common system and at least two control valves, each of the two working cylinders being associated with one of the two control valves, and each of the two working cylinders being individually connectable to or disconnectable from, by the associated one of the two control valves, to one of the first or second hydraulic main lines.

7. A hydraulic system for supporting a vehicle or a container on a substrate, the hydraulic system comprising:
    at least two supporting cylinders for extending ground supports;
    at least two hydraulic main lines;
    at least two hydraulic pumps, each being connected to one of the two hydraulic main lines;
    at least one of the two supporting cylinders being associated with a first of the two hydraulic main lines;
    at least one of the two supporting cylinders being associated with a second of the two hydraulic main lines;
    a main valve for connecting or disconnecting the first and second hydraulic main lines to one another or from one another, respectively;
    at least one hydraulic motor or a further working cylinder;
    the at least one hydraulic motor or the further working cylinder is configured for controlling movement of an extendable space of the vehicle or the container, an interior of the vehicle or the container being able to be enlarged thereby; or
    the at least one hydraulic motor or the further working cylinder is configured for controlling a closing element of a storage space or an interior of the vehicle or the container; or
    the at least one hydraulic motor or the further working cylinder is configured for controlling a lifting platform provided on the vehicle or on the container; or
    the at least one hydraulic motor or the further working cylinder is configured for controlling an entry system; or
    the at least one hydraulic motor is configured for driving a movement system for moving the vehicle.

8. The hydraulic system as claimed in claim 7, further comprising two separate return lines and the two supporting cylinders each include at least one pressure chamber, each of the separate return lines connecting the at least one pressure chamber of at least one of the two supporting cylinders, or connecting the further working cylinder, acting in a retracting direction, to one of the two hydraulic pumps.

9. The hydraulic system as claimed in claim 8, wherein:
    the hydraulic system comprises a common hydraulic fluid tank for feeding the two hydraulic pumps; or
    the hydraulic system comprises an outflow pressure compensator configured to provide a synchronous outflow of at least two of the supporting cylinders.

10. The hydraulic system as claimed in claim 8, further comprising a second main valve, the second main valve connecting the two separate return lines to one another or disconnecting the two separate return lines from one another.

11. The hydraulic system as claimed in claim 7, wherein the hydraulic system is configured such that when the main valve is closed the at least one of the two supporting cylinders associated with the first hydraulic main line is fed exclusively by one of the two hydraulic pumps and the at least one of the two supporting cylinders associated with the second hydraulic main line is fed exclusively by the other of the two hydraulic pumps.

12. The hydraulic system as claimed in claim 7, wherein the at least one of the two supporting cylinders associated with the first hydraulic main line comprises a front supporting cylinder for extending a front ground support, and the at least one of the two supporting cylinders associated with the second hydraulic main line comprises a rear supporting cylinder for extending rear ground supports.

13. The hydraulic system as claimed in claim 7, wherein the hydraulic system comprises at least two hydraulic motors or two further working cylinders for driving a common unit or a common system, and the two hydraulic motors or the two further working cylinders are provided on different ones of the two hydraulic main lines.

14. The hydraulic system as claimed in claim 7, wherein:
    the hydraulic system comprises at least two supporting cylinder valves, each of the two supporting cylinders being associated with one of the two supporting cylinder valves, and each of the two supporting cylinders being individually connectable to or individually disconnectable from, by the associated one of the two supporting cylinder valves, the first or second hydraulic main line associated therewith; or
    the hydraulic system comprises two further working cylinders for driving a common unit or a common system and at least two control valves, each of the two further working cylinders being associated with one of the two control valves, and each of the two further working cylinders being individually connectable to or disconnectable from, by the associated one of the two control valves, to one of the first or second hydraulic main lines.

15. A vehicle comprising:
    at least two extendable ground supports; and
    a hydraulic system for supporting the vehicle and extending and retracting the ground supports, the hydraulic system comprising:
        at least two supporting cylinders for extending the respective ground supports;
        at least two hydraulic main lines;
        at least two hydraulic pumps each being connected to one of the two hydraulic main lines;
        a first electric motor connected to one of the two hydraulic pumps;
        a second electric motor connected to another of the two hydraulic pumps;
        at least a first one of the two supporting cylinders being connected for fluid communication with a first of the two hydraulic main lines such that the first one of the two supporting cylinders is supplied with fluid by the first hydraulic main line;
        at least a second one of the two supporting cylinders being connected for fluid communication with a second of the two hydraulic main lines such that the second one of the two supporting cylinders is supplied with fluid by the second hydraulic main line; and
        a switchable main valve disposed to selectively fluidly connect or disconnect the first and second hydraulic main lines to one another or from one another, respectively.

16. The vehicle as claimed in claim 15, wherein the vehicle comprises a movement system for moving the vehicle, the hydraulic system comprises at least one hydraulic motor or at least one working cylinder to drive the movement system.

17. The vehicle as claimed in claim 15, wherein the hydraulic system comprises a working cylinder and the vehicle further comprises an extendable space, a closing element, a lifting platform or an entry system movable by the working cylinder of the hydraulic system.

18. A method for operating a hydraulic system as claimed in claim 1, the method comprising the following steps:

opening the main valve;

while the main valve is open, initially the at least one supporting cylinder associated with the first hydraulic main line is partially extended;

subsequently, while the main valve is open, the at least one supporting cylinder associated with the second hydraulic main line is partially extended;

subsequently the main valve is closed; and the supporting cylinders associated with the first and second hydraulic main lines are extended further simultaneously by the respective hydraulic pumps.

19. The method for operating a hydraulic system as claimed in claim 18, comprising at least one of the following steps:

during the extension of a supporting cylinder this supporting cylinder is fed during a partial phase by both hydraulic pumps and during a different partial phase by only one of the hydraulic pumps; or if a malfunction of one of the hydraulic pumps is ascertained, the main valve is opened so that the remaining functional hydraulic pump can feed all of the supporting cylinders; or a pumping capacity of the hydraulic pumps is adapted by changing a rotational speed of the hydraulic pumps or deactivating one of the hydraulic pumps.

* * * * *